United States Patent
Vedantham et al.

(10) Patent No.: US 9,300,361 B2
(45) Date of Patent: *Mar. 29, 2016

(54) ENABLING CO-EXISTENCE AMONG POWER LINE COMMUNICATION (PLC) TECHNOLOGIES

(71) Applicant: Texas Instruments Incorporated, Dallas, TX (US)

(72) Inventors: Ramanuja Vedantham, Allen, TX (US); Anand Dabak, Plano, TX (US); Tarkesh Pande, Richardson, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/576,334

(22) Filed: Dec. 19, 2014

(65) Prior Publication Data
US 2015/0180539 A1    Jun. 25, 2015

Related U.S. Application Data

(62) Division of application No. 13/659,870, filed on Oct. 24, 2012, now Pat. No. 8,948,274.

(60) Provisional application No. 61/550,771, filed on Oct. 24, 2011.

(51) Int. Cl.
*H04B 3/00* (2006.01)
*H04B 3/54* (2006.01)

(52) U.S. Cl.
CPC .................. *H04B 3/54* (2013.01); *H04B 3/546* (2013.01); *H04B 2203/5408* (2013.01); *H04B 2203/5433* (2013.01); *H04B 2203/5445* (2013.01)

(58) Field of Classification Search
None
See application file for complete search history.

(56) References Cited

U.S. PATENT DOCUMENTS

| | | | |
|---|---|---|---|
| 6,909,723 B1 * | 6/2005 | Yonge et al. | 370/447 |
| 7,570,656 B2 | 8/2009 | Raphaeli et al. | |
| 8,675,651 B2 | 3/2014 | McFarland et al. | |
| 2005/0185629 A1 | 8/2005 | Kuroda et al. | |
| 2011/0090067 A1 | 4/2011 | Kuroda et al. | |
| 2012/0093198 A1 | 4/2012 | Dabak et al. | |

* cited by examiner

*Primary Examiner* — Adolf Dsouza
(74) *Attorney, Agent, or Firm* — Steven A. Shaw; Frank D. Cimino

(57) ABSTRACT

Systems and methods for enabling co-existence among power line communications (PLC) technologies are described. In some embodiments, a method performed by a PLC device, such as a PLC gateway, may include detecting a communication from foreign PLC device on a PLC network in response to a foreign preamble received by the PLC device, terminating transmissions to the PLC network for a network-specific co-existence Extended Interframe Space (cEIFS) time period in response to the foreign preamble, and resuming transmissions to the PLC network after expiration of the network-specific time period.

16 Claims, 5 Drawing Sheets

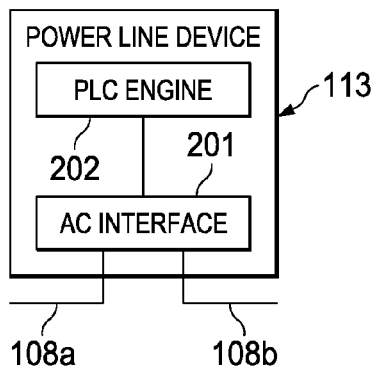
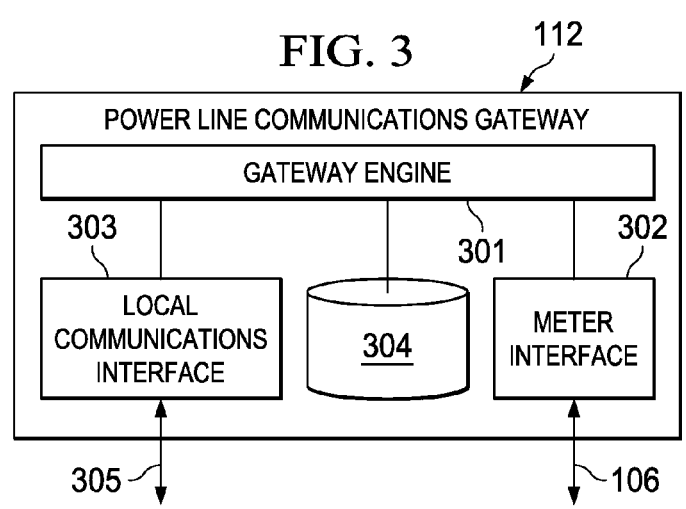
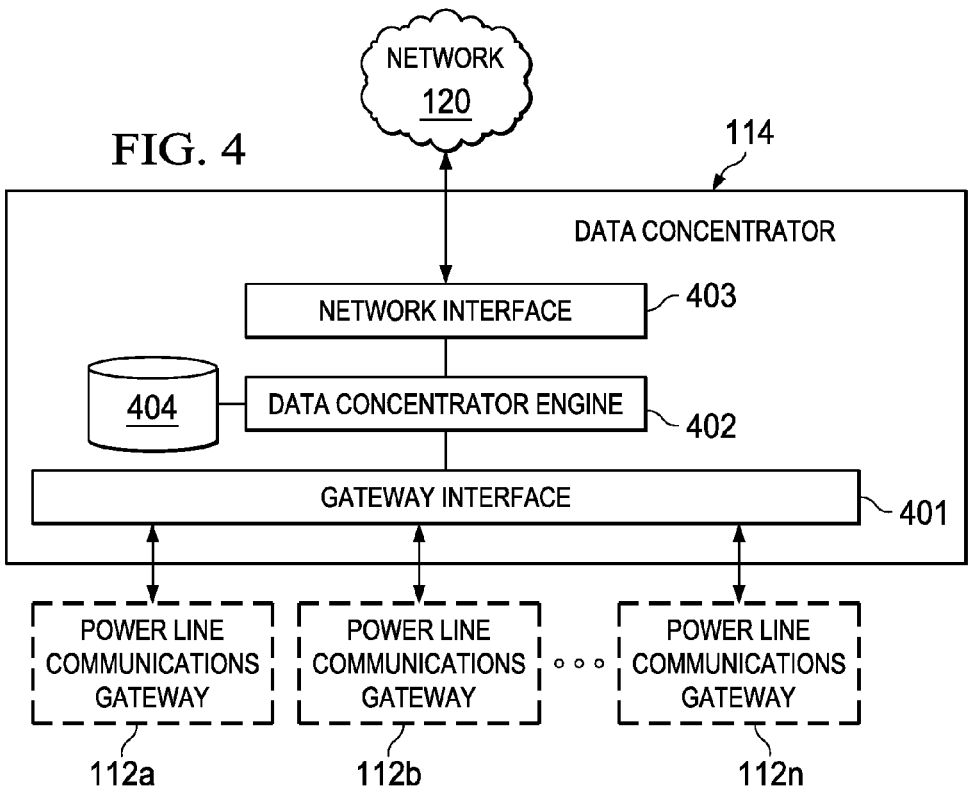

ENABLING CO-EXISTENCE AMONG POWER LINE COMMUNICATION (PLC) TECHNOLOGIES

CROSS-REFERENCE TO RELATED APPLICATION

This application is a Divisional of and claims priority to U.S. patent application Ser. No. 13/659,870 filed on Oct. 24, 2012, which claims the benefit of the filing date of U.S. Provisional Patent Application No. 61/550,771, which is titled "Enabling Co-Existence among Power Line Communication PLC Technologies" and was filed on Oct. 24, 2011, said applications are hereby incorporated by reference herein in their entirety.

BACKGROUND

Power line communications (PLC) include systems for communicating data over the same medium that is also used to transmit electric power to residences, buildings, and other premises, such as wires, power lines, or other conductors. In its simplest terms, PLC modulates communication signals over existing power lines. This enables devices to be networked without introducing any new wires or cables. This capability is extremely attractive across a diverse range of applications that can leverage greater intelligence and efficiency through networking. PLC applications include utility meters, home area networks, lighting, and solar.

Using PLC to communicate with utility meters enable applications such as Automated Meter Reading (AMR) and Automated Meter Infrastructure (AMI) communications without the need to install additional wires. Consumers may also use PLC to connect home electric meters to an energy monitoring device or in-home display monitor their energy consumption and to leverage lower-cost electric pricing based on time-of-day demand.

As the home area network expands to include controlling home appliances for more efficient consumption of energy, OEMs may use PLC to link these devices and the home network. PLC may also support home and industrial automation by integrating intelligence into a wide variety of lighting products to enable functionality such as remote control of lighting, automated activation and deactivation of lights, monitoring of usage to accurately calculate energy costs, and connectivity to the grid.

PLC may also serve as an important enabling technology for the mass deployment of solar equipment by providing a communication channel to solar inverters for monitoring and managing power across the grid by utility companies. While radio frequency (RF) communications have made some progress in solar installations, PLC offers an ideal means for connecting equipment with high reliability and at a low cost on DC or AC lines.

PLC is a generic term for any technology that uses power lines as a communications channel. Various PLC standardization efforts are currently in work around the world. The different standards focus on different performance factors and issues relating to particular applications and operating environments. Two of the most well-known PLC standards are G3 and PRIME. G3 has been approved by the International Telecommunication Union (ITU). IEEE is developing the IEEE P1901.2 standard that is based on G3. Each PLC standard has its own unique characteristics.

The manner in which PLC systems are implemented depends upon local regulations, characteristics of local power grids, etc. The frequency band available for PLC users depends upon the location of the system. In Europe, PLC bands are defined by the CENELEC (European Committee for Electrotechnical Standardization). The CENELEC-A band (3 kHz-95 kHz) is exclusively for energy providers. The CENELEC-B, C, D bands are open for end user applications, which may include PLC users. Typically, PLC systems operate between 35-90 kHz in the CENELEC A band using 36 tones spaced 1.5675 kHz apart. In the United States, the FCC has conducted emissions requirements that start at 535 kHz and therefore the PLC systems have an FCC band defined from 154-487.5 kHz using 72 tones spaced at 4.6875 kHz apart. In other parts of the world different frequency bands are used, such as the Association of Radio Industries and Businesses (ARIB)-defined band in Japan, which operates at 10-450 kHz, and the Electric Power Research Institute (EPRI)-defined bands in China, which operates at 3-90 kHz.

SUMMARY

Systems and methods for enabling co-existence among power line communications (PLC) technologies are described. In some embodiments, a method performed by a PLC device, such as a PLC gateway, may include detecting a communication from foreign PLC device on a PLC network in response to a foreign preamble received by the PLC device, terminating transmissions to the PLC network for a network-specific time period in response to the foreign preamble, and resuming transmissions to the PLC network after expiration of the network-specific time period.

In a further embodiment, the method may include decoding the communication according to a predetermine operation, determining whether an error occurred while decoding the communication, and sending data from the decoded communication to an upper device layer in response to a determination that no error occurred. Additionally, the method may include detecting both a communication from a native PLC device and a communication from a foreign PLC device within a detection time period. The method may further include decoding incoming packets that do not require transmission of a responsive packet during the network-specific time period.

In one embodiment, the method may include determining an Extended Interframe Space (EIFS) duration for each device in the network. The method may further include identifying a maximum EIFS duration. Also, the method may include identifying a minimum EIFS duration. In one embodiment, the method may include setting the network-specific time period to the minimum EIFS duration in response to a determination that all devices in the network are configured to transmit small-sized frames. Alternatively, the method may include setting the network-specific time period to the maximum EIFS duration where no determination that all devices in the network are configured to transmit small-sized frames is made.

An electronic storage medium having program instructions stored thereon that, upon execution by a processor within a power line communication (PLC) device is also presented. In one embodiment, the program instructions may cause the PLC device to detect a communication from foreign PLC device on a PLC network in response to a foreign preamble received by the PLC device, terminate transmissions to the PLC network for a network-specific co-existence EIFS (cEIFS) time period in response to the foreign preamble, and resume transmissions to the PLC network after expiration of the network-specific time period.

In one embodiment, the instructions may also cause the PLC device to determine an Extended Interframe Space (EIFS) duration for each device in the network, identify a maximum EIFS duration, identify a minimum EIFS duration, set the network-specific cEIFS time period equal to the minimum EIFS duration in response to a determination that all devices in the network are configured to transmit small-sized frames, and set the network-specific cEIFS time period to the maximum EIFS duration where no determination that all devices in the network are configured to transmit small-sized frames is made.

In one embodiment, detecting includes receiving a co-existence preamble, and not detecting a native preamble. Alternatively, detecting may include receiving a co-existence preamble followed by a non-native preamble.

In some embodiments, one or more of the methods described herein may be performed by one or more PLC devices (e.g., a PLC meter, PLC data concentrator, etc.). In other embodiments, a tangible electronic storage medium may have program instructions stored thereon that, upon execution by a processor within one or more PLC devices, cause the one or more PLC devices to perform one or more operations disclosed herein. Examples of such a processor include, but are not limited to, a digital signal processor (DSP), an application specific integrated circuit (ASIC), a system-on-chip (SoC) circuit, a field-programmable gate array (FPGA), a microprocessor, or a microcontroller. In yet other embodiments, a PLC device may include at least one processor and a memory coupled to the at least one processor, the memory configured to store program instructions executable by the at least one processor to cause the PLC device to perform one or more operations disclosed herein.

BRIEF DESCRIPTION OF THE SEVERAL VIEWS OF THE DRAWINGS

Figure 1:
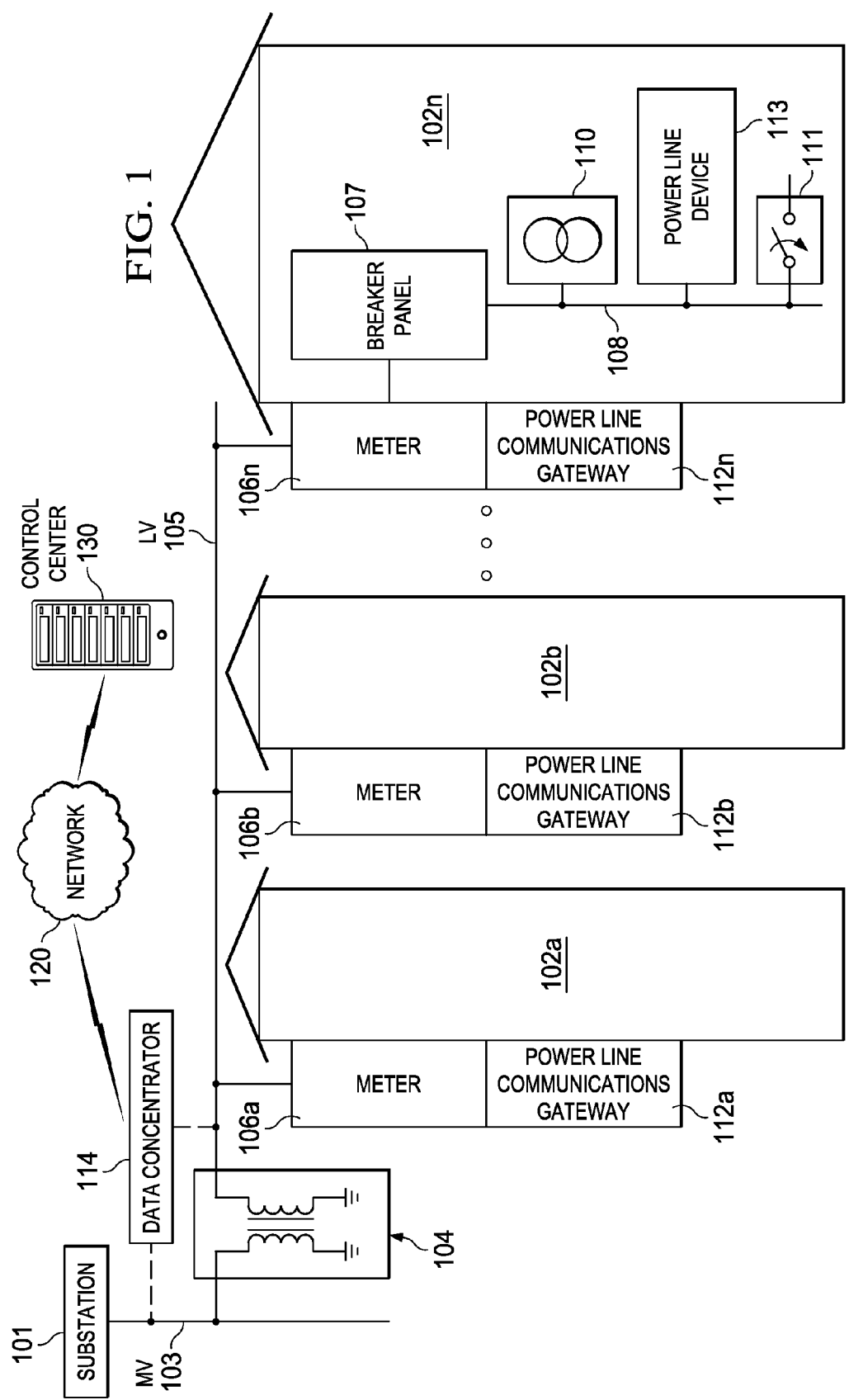

Having thus described the invention(s) in general terms, reference will now be made to the accompanying drawings, wherein:

FIG. 1 is a diagram of a PLC system according to some embodiments.

FIG. 2 is a block diagram of a PLC device or modem according to some embodiments.

FIG. 3 is a block diagram of a PLC gateway according to some embodiments.

FIG. 4 is a block diagram of a PLC data concentrator according to some embodiments.

Figure 5:
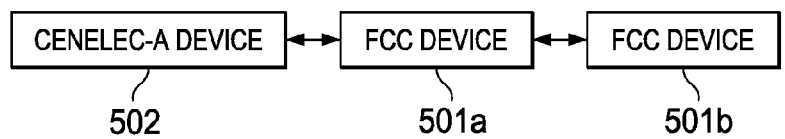

FIG. 5 is a block diagram illustrating one embodiment of a system for co-existence among PLC technologies.

Figure 6:
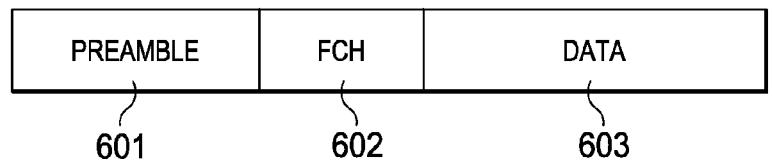

FIG. 6 is a diagram illustrating one embodiment of a data packet in a PLC system.

Figure 7A:
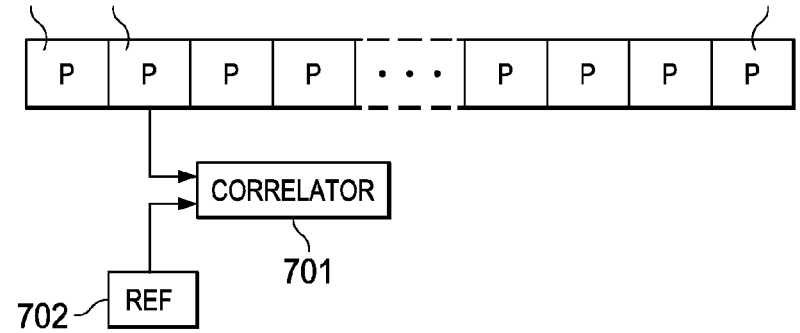

FIG. 7A is a diagram illustrating one embodiment of a method for detecting a foreign preamble.

Figure 7B:
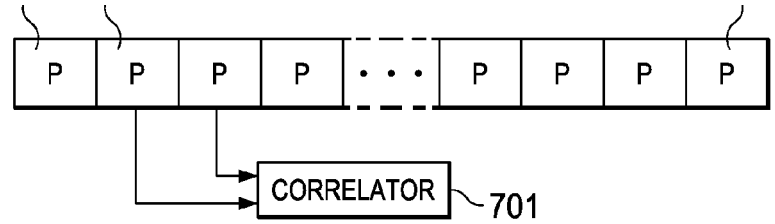

FIG. 7B is a diagram illustrating another embodiment of a method for detecting a foreign preamble.

Figure 8:
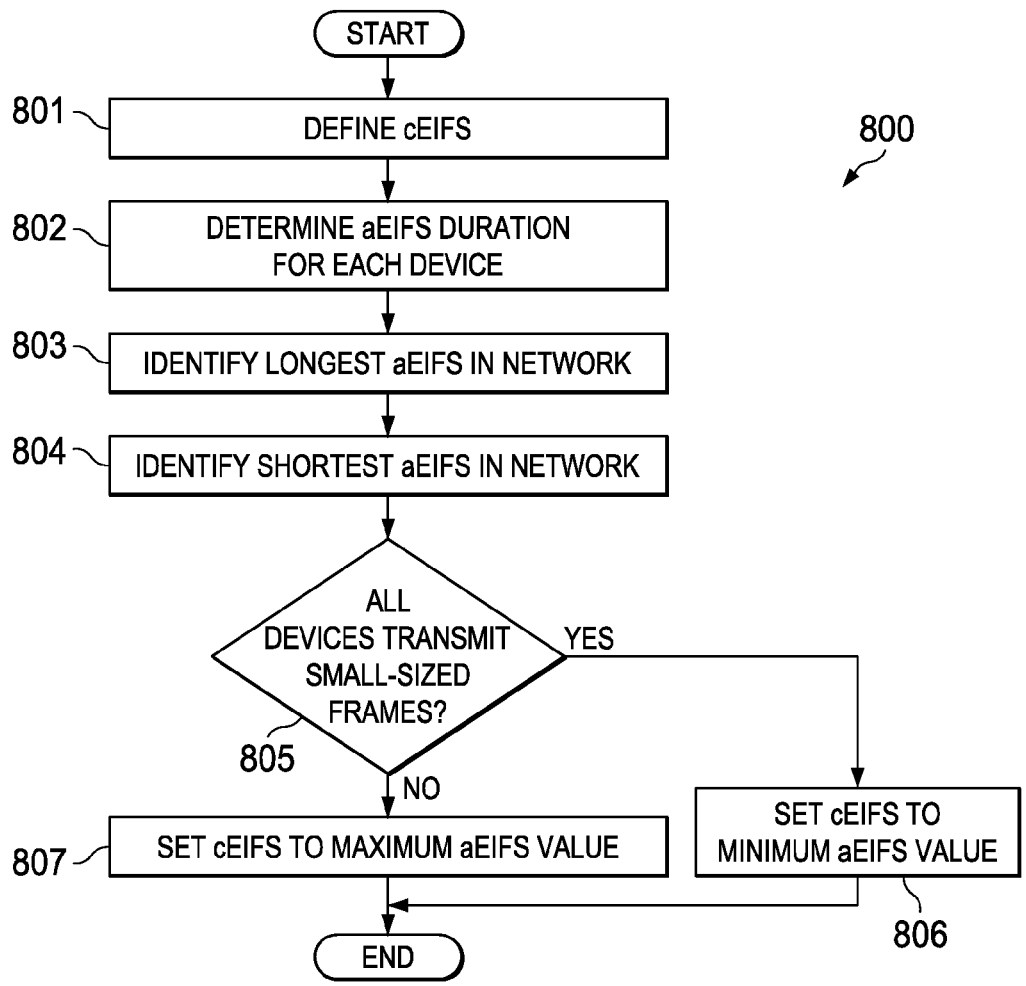

FIG. 8 is a flowchart illustrating one embodiment of a method for co-existence among PLC technologies.

Figure 9:
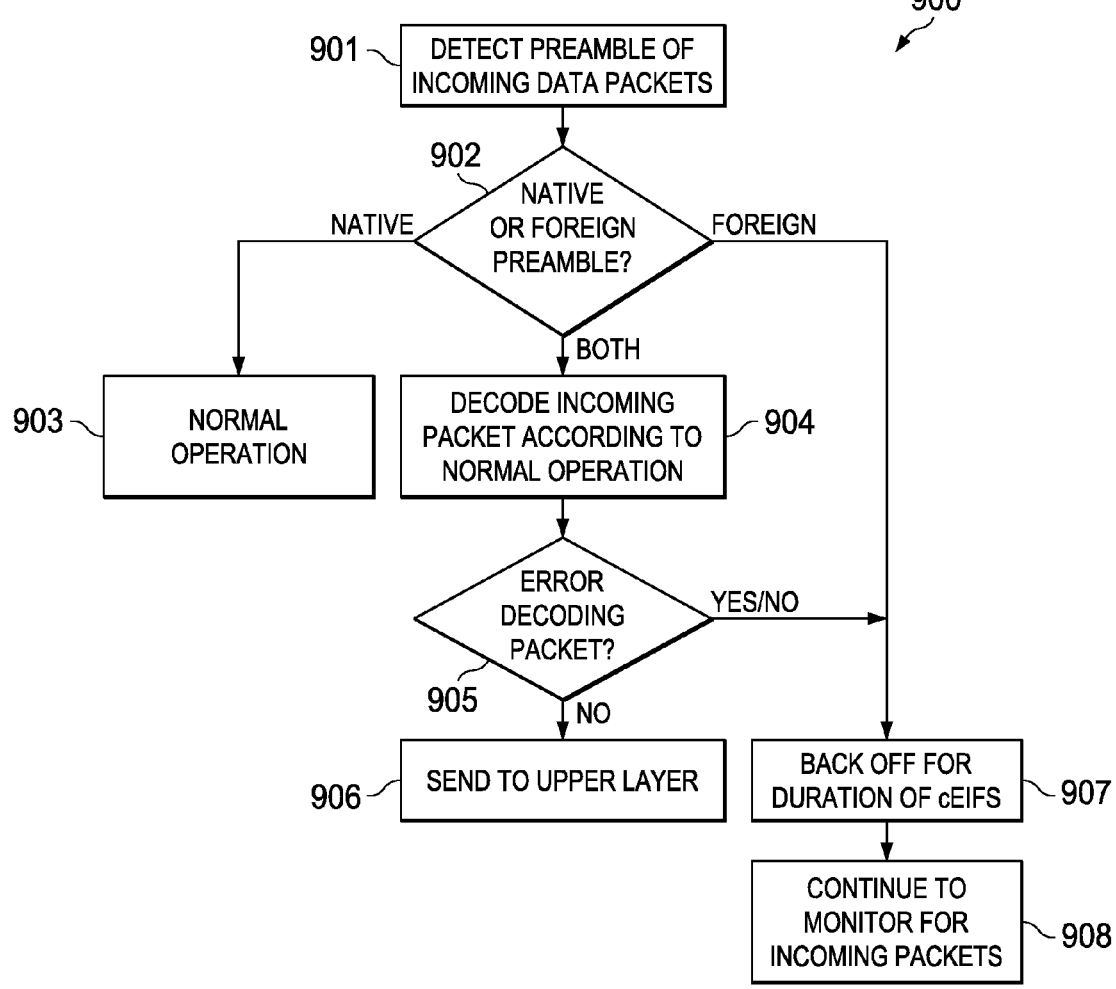

FIG. 9 is a flowchart illustrating another embodiment of a method for co-existence among PLC technologies.

Figure 10:
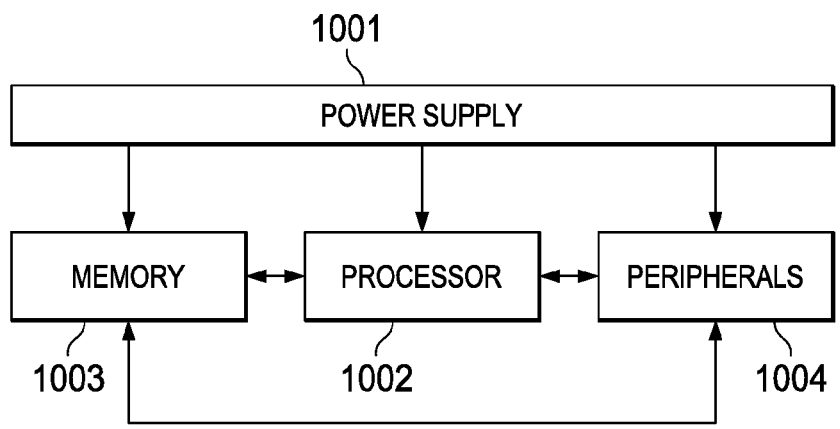

FIG. 10 is a block diagram of an integrated circuit according to some embodiments.

DETAILED DESCRIPTION

The invention(s) now will be described more fully hereinafter with reference to the accompanying drawings. The invention(s) may, however, be embodied in many different forms and should not be construed as limited to the embodiments set forth herein. Rather, these embodiments are provided so that this disclosure will be thorough and complete, and will fully convey the scope of the invention(s) to a person of ordinary skill in the art. A person of ordinary skill in the art may be able to use the various embodiments of the invention(s).

The present embodiments are directed to systems and methods for enabling co-existence among PLC technologies. There are currently many different industry standards that define communications between PLC devices. Devices configured to different standards may communicate according to different protocols, which means that they may or may not be compatible. As used herein, the term "native packet" refers to a data packet received by a PLC device that is from a remote PLC device which operates according to the same standard or band plan as the PLC device that received the packet. As used herein, the term "foreign packet" refers to a data packet received by a PLC device that is from a remote PLC device which operates according to a different standard or band plan than the PLC device that received the packet. As used herein, the terms "native preamble" and "foreign preamble" refers to a preamble portion of a native packet or foreign packet respectively. The present embodiments facilitate co-existence of devices operating according to different standards or protocols. An example of such a system is described below in FIG. 5. FIGS. 1-4 describe the systems and methods generally.

FIG. 1 illustrates a PLC system according to some embodiments. Medium voltage (MV) power lines 103 from substation 101 typically carry voltage in the tens of kilovolts range. Transformer 104 steps the MV power down to low voltage (LV) power on LV lines 105, carrying voltage in the range of 100-240 VAC. Transformer 104 is typically designed to operate at very low frequencies in the range of 50-60 Hz. Transformer 104 does not typically allow high frequencies, such as signals greater than 100 KHz, to pass between LV lines 105 and MV lines 103. LV lines 105 feed power to customers via meters 106a-n, which are typically mounted on the outside of residences 102a-n. Although referred to as "residences," premises 102a-n may include any type of building, facility, electric vehicle charging station, or other location where electric power is received and/or consumed. A breaker panel, such as panel 107, provides an interface between meter 106n and electrical wires 108 within residence 102n. Electrical wires 108 deliver power to outlets 110, switches 111 and other electric devices within residence 102n.

The power line topology illustrated in FIG. 1 may be used to deliver high-speed communications to residences 102a-n. In some implementations, power line communications modems or gateways 112a-n may be coupled to LV power lines 105 at meter 106a-n. PLC modems/gateways 112a-n may be used to transmit and receive data signals over MV/LV lines 103/105. Such data signals may be used to support metering and power delivery applications (e.g., smart grid applications), communication systems, high speed Internet, telephony, video conferencing, and video delivery, to name a few. By transporting telecommunications and/or data signals over a power transmission network, there is no need to install new cabling to each subscriber 102a-n. Thus, by using existing electricity distribution systems to carry data signals, significant cost savings are possible.

An illustrative method for transmitting data over power lines may use a carrier signal having a frequency different from that of the power signal. The carrier signal may be modulated by the data, for example, using an OFDM technology or the like described, for example, by the PRIME, G3 or IEEE 1901 standards.

PLC modems or gateways 112*a-n* at residences 102*a-n* use the MV/LV power grid to carry data signals to and from PLC data concentrator or router 114 without requiring additional wiring. Concentrator 114 may be coupled to either MV line 103 or LV line 105. Modems or gateways 112*a-n* may support applications such as high-speed broadband Internet links, narrowband control applications, low bandwidth data collection applications, or the like. In a home environment, for example, modems or gateways 112*a-n* may further enable home and building automation in heat and air conditioning, lighting, and security. Also, PLC modems or gateways 112*a-n* may enable AC or DC charging of electric vehicles and other appliances. An example of an AC or DC charger is illustrated as PLC device 113. Outside the premises, power line communication networks may provide street lighting control and remote power meter data collection.

One or more PLC data concentrators or routers 114 may be coupled to control center 130 (e.g., a utility company) via network 120. Network 120 may include, for example, an IP-based network, the Internet, a cellular network, a WiFi network, a WiMax network, or the like. As such, control center 130 may be configured to collect power consumption and other types of relevant information from gateway(s) 112 and/or device(s) 113 through concentrator(s) 114. Additionally or alternatively, control center 130 may be configured to implement smart grid policies and other regulatory or commercial rules by communicating such rules to each gateway(s) 112 and/or device(s) 113 through concentrator(s) 114.

FIG. 2 is a block diagram of PLC device 113 according to some embodiments. As illustrated, AC interface 201 may be coupled to electrical wires 108*a* and 108*b* inside of premises 112*n* in a manner that allows PLC device 113 to switch the connection between wires 108*a* and 108*b* off using a switching circuit or the like. In other embodiments, however, AC interface 201 may be connected to a single wire 108 (i.e., without breaking wire 108 into wires 108*a* and 108*b*) and without providing such switching capabilities. In operation, AC interface 201 may allow PLC engine 202 to receive and transmit PLC signals over wires 108*a-b*. In some cases, PLC device 113 may be a PLC modem. Additionally or alternatively, PLC device 113 may be a part of a smart grid device (e.g., an AC or DC charger, a meter, etc.), an appliance, or a control module for other electrical elements located inside or outside of premises 112*n* (e.g., street lighting, etc.).

PLC engine 202 may be configured to transmit and/or receive PLC signals over wires 108*a* and/or 108*b* via AC interface 201 using a particular frequency band. In some embodiments, PLC engine 202 may be configured to transmit OFDM signals, although other types of modulation schemes may be used. As such, PLC engine 202 may include or otherwise be configured to communicate with metrology or monitoring circuits (not shown) that are in turn configured to measure power consumption characteristics of certain devices or appliances via wires 108, 108*a*, and/or 108*b*. PLC engine 202 may receive such power consumption information, encode it as one or more PLC signals, and transmit it over wires 108, 108*a*, and/or 108*b* to higher-level PLC devices (e.g., PLC gateways 112*n*, data aggregators 114, etc.) for further processing. Conversely, PLC engine 202 may receive instructions and/or other information from such higher-level PLC devices encoded in PLC signals, for example, to allow PLC engine 202 to select a particular frequency band in which to operate.

FIG. 3 is a block diagram of PLC gateway 112 according to some embodiments. As illustrated in this example, gateway engine 301 is coupled to meter interface 302, local communication interface 304, and frequency band usage database 304. Meter interface 302 is coupled to meter 106, and local communication interface 304 is coupled to one or more of a variety of PLC devices such as, for example, PLC device 113. Local communication interface 304 may provide a variety of communication protocols such as, for example, ZIGBEE, BLUETOOTH, WI-FI, WI-MAX, ETHERNET, etc., which may enable gateway 112 to communicate with a wide variety of different devices and appliances. In operation, gateway engine 301 may be configured to collect communications from PLC device 113 and/or other devices, as well as meter 106, and serve as an interface between these various devices and PLC data concentrator 114. Gateway engine 301 may also be configured to allocate frequency bands to specific devices and/or to provide information to such devices that enable them to self-assign their own operating frequencies.

In some embodiments, PLC gateway 112 may be disposed within or near premises 102*n* and serve as a gateway to all PLC communications to and/or from premises 102*n*. In other embodiments, however, PLC gateway 112 may be absent and PLC devices 113 (as well as meter 106*n* and/or other appliances) may communicate directly with PLC data concentrator 114. When PLC gateway 112 is present, it may include database 304 with records of frequency bands currently used, for example, by various PLC devices 113 within premises 102*n*. An example of such a record may include, for instance, device identification information (e.g., serial number, device ID, etc.), application profile, device class, and/or currently allocated frequency band. As such, gateway engine 301 may use database 305 in assigning, allocating, or otherwise managing frequency bands assigned to its various PLC devices.

FIG. 4 is a block diagram of PLC data concentrator or router 114 according to some embodiments. Gateway interface 401 is coupled to data concentrator engine 402 and may be configured to communicate with one or more PLC gateways 112*a-n*. Network interface 403 is also coupled to data concentrator engine 402 and may be configured to communicate with network 120. In operation, data concentrator engine 402 may be used to collect information and data from multiple gateways 112*a-n* before forwarding the data to control center 130. In cases where PLC gateways 112*a-n* are absent, gateway interface 401 may be replaced with a meter and/or device interface (now shown) configured to communicate directly with meters 116*a-n*, PLC devices 113, and/or other appliances. Further, if PLC gateways 112*a-n* are absent, frequency usage database 404 may be configured to store records similar to those described above with respect to database 304.

FIG. 5 illustrates one embodiment of a system 500 in which devices of different standards or protocols may operate together in coexistence. In this example, the system 500 may include a first FCC device 501*a* and a second FCC device 501*b*. In addition, the system 500 may include a CENELEC A-band device 502. One of ordinary skill in the art may recognize that FCC devices 501 *a-b* may operate on different frequency bands and be configured to generate preambles of different formats. Nonetheless, when configured according the present embodiments, FCC devices 501*a-b* and CENELEC A device 502 may co-exist in the same system.

In an alternative embodiment, the system may include devices operating according to different standards or protocols that all communication on the FCC frequencies. For example, the system may include G3 devices that operate according to ITU or IEEE standards, such as IEEE 1901. The system may also include devices that operate according to the PRIME standard. The present embodiments may also enable co-existence between these devices.

FIG. 6 illustrates one embodiment of a data packet 600 that may be communicated between the devices 501-502 of FIG. 5. In one embodiment, the data packet 600 may include a preamble 601, a frame control header (FCH) 602, and a sequence of data bits 603. When devices communicate, they may detect a preamble 601. In one embodiment, the first FCC device 501a may determine whether the incoming data packet 600 is of a native format (i.e., from the second FCC device 501b) or is of a foreign format (i.e., from CENELEC-A device 502) by detecting and analyzing the preamble 601.

FIG. 7A illustrates one embodiment of a method for detecting whether a preamble 601 is of native or foreign format. In this embodiment, the incoming sequence is compared by a correlator 701 with preamble sequences for different bands and co-existing technologies in that band which may be provided by a reference source 702. In this embodiment, there may be a separate preamble detector for each preamble period.

FIG. 7B illustrates another embodiment of a method for detecting whether a preamble 601 is of native or foreign format. In this embodiment, the incoming sequence is compared with a previous signal by correlator 701. This method is based on correlation of the incoming signal with previous signal set as reference to take advantage of the preamble being a repetitive signal.

Each device 501-502 in the coexistence system 500 may be configured to take certain actions in response to a determination that a foreign preamble has been received. Certain of these actions may be referred to as Carrier Sense Multiple Access with Collision Avoidance (CSMA/CA) mechanisms. In addition preamble detection, the present embodiments may identify a common back-off duration for the entire system such that there is commonality or coherence between devices in the system in terms of back-off protocol. Accordingly, the back-off duration may be technology/band agnostic so that all devices in the system wait the same or a similar duration, which ensures fairness among co-existing devices. Additionally, the present embodiments describe methods for handling situations in which both native and foreign preambles are detected.

An Extended Interframe Space (EIFS) is defined by some standards for situations in which a device experiences an unexpected error, either due to incompatible foreign devices on the same network, or due to other network related packet collisions and contention. The EIFS is typically longer than other interframe spaces, and is configured to provide protection from collision for an ongoing frame transmission or segment burst. Unfortunately, different standards and technologies define different durations for EIFS, which is problematic from a coexistence standpoint. For example, in the system described in FIG. 5, EIFS duration for the CEN-A device 502 may be different than the EIFS duration for the FCC devices 501 a-b. Similarly, the EIFS for IEEE 1901.2 and G.hnem may also be different.

FIG. 8 illustrates one embodiment of a method 800 for enabling co-existence between PLC devices. In the depicted embodiment, the method begins with defining 802 a co-existence EIFS (cEIFS) parameter, which defines a common back-off duration for all devices, regardless of the devices technology or band plan. In one embodiment, cEIFS may be a Personal Area Network (PAN) specific or other network-specific parameter, thus it may be variable depending on network conditions and the types of devices operating within the network. This PAN-specific approach may provide greater efficiency and flexibility. Defining 801 the cEIFS may, for example, include initializing a cEIFS variable in the network communications protocol.

The method 800 may also include determining 802 an aEIFS period for all devices within the same within the network. For example, in the system 500 of FIG. 5, the devices 501-502 may be pulled to determine the aEIFS duration of each device.

In one embodiment, the method 800 may include identifying 803 the longest aEIFS of the devices in the PAN and identifying 804 the shortest aEIFS in the network. For example, the first FCC 501a may compare the length of the aEIFS associated with the preamble received from the second FCC device 501b with an aEIFS associated with a preamble received from the CEN-A device 502. The first FCC device 501a may then identify which aEIFS is longer using, e.g., a comparator, a counter, a software defined counter, frequency and/or time analysis, or the like. One of ordinary skill in the art may recognize a variety of methods for identifying 803 which aEIFS is longer and identifying 804 which is shorter.

In one embodiment, the method 800 may also include determining 805 whether any a priori knowledge exists regarding whether the devices in the network transmit small sized frames. In various embodiments, the term "small sized" may refer to the symbol length, the time period, or both. If it is determined 805 that all devices transmit small sized frames, then the minimum aEIFS duration may be selected 806 for the value of cEIFS. If, on the other hand, no a priori knowledge exists as to the frame sizes, or not all devices transmit small sized frames, then the maximum aEIFS duration may be selected 807 for the value of cEIFS.

FIG. 9 illustrates a further method 900 for co-existence between PLC devices. In one embodiment, the method 900 includes detecting 901 preambles 601 of incoming packets 600. The method 900 may further include determining 902 whether native packets, foreign packets, or both types of packets have been received 901. If it is determined 902 that the preambles are a native format, then the device operates 903 according to normal operation. If only foreign preambles are detected 902, then the device is set to back-off 907 for a period of time. In one embodiment, the back-off duration is the duration of cEIFS as determined according to an embodiment such as the method 800 of FIG. 8.

In one embodiment, if it is determined 902 that both native and foreign packets have been received, then the PLC device may decode 904 the incoming packet according to normal operations. If it is determined 905 that no error occurred in the decoding process, then it is assumed that the incoming packet is a native format packet and the decoded data may be sent 906 to an upper layer for further processing. Regardless of whether it is determined 905 that an error in decoding the packet occurred or not, however, the PLC device will be configured to back off 907 for a duration of cEIFS, for example.

In some embodiments, the PLC device may be configured to continue monitoring 908 for incoming packets, but will not allow for transmission of any frame, including ACK frames for the duration of cEIFS. For example, the PLC device may receive any multi-cast or broadcast frames that do not require ACK transmissions.

FIG. 10 is a block diagram of a circuit for implementing co-existence between PLC devices according to some embodiments. In some cases, one or more of the devices and/or apparatuses shown in FIGS. 1-4 may be implemented as shown in FIG. 10. In some embodiments, processor 1002 may be a digital signal processor (DSP), an application specific integrated circuit (ASIC), a system-on-chip (SoC) circuit, a field-programmable gate array (FPGA), a microprocessor, a microcontroller, or the like. Processor 1002 is coupled to one or more peripherals 1004 and external memory 1003. In some cases, external memory 1003 may be used to store and/or maintain databases 304 and/or 404 shown in FIGS. 3 and 4. Further, processor 1002 may include a driver for communicating signals to external memory 1003 and another driver for communicating signals to peripherals 1004. Power supply 1001 provides supply voltages to processor 02 as well as one or more supply voltages to memory 1003 and/or peripherals 1004. In some embodiments, more than one instance of processor 1002 may be included (and more than one external memory 1003 may be included as well).

Peripherals 1004 may include any desired circuitry, depending on the type of PLC system. For example, in an embodiment, peripherals 1004 may implement local communication interface 303 and include devices for various types of wireless communication, such as WI-FI, ZIGBEE, BLUETOOTH, cellular, global positioning system, etc. Peripherals 1004 may also include additional storage, including RAM storage, solid-state storage, or disk storage. In some cases, peripherals 1004 may include user interface devices such as a display screen, including touch display screens or multitouch display screens, keyboard or other input devices, microphones, speakers, etc.

External memory 1003 may include any type of memory. For example, external memory 1003 may include SRAM, nonvolatile RAM (NVRAM, such as "flash" memory), and/or dynamic RAM (DRAM) such as synchronous DRAM (SDRAM), double data rate (DDR, DDR2, DDR3, etc.) SDRAM, DRAM, etc. External memory 1003 may include one or more memory modules to which the memory devices are mounted, such as single inline memory modules (SIMMs), dual inline memory modules (DIMMs), etc.

It will be understood that in various embodiments, the modules shown in FIGS. 2-4 may represent sets of software routines, logic functions, and/or data structures that are configured to perform specified operations. Although these modules are shown as distinct logical blocks, in other embodiments at least some of the operations performed by these modules may be combined in to fewer blocks. Conversely, any given one of the modules shown in FIGS. 2-4 may be implemented such that its operations are divided among two or more logical blocks. Moreover, although shown with a particular configuration, in other embodiments these various modules may be rearranged in other suitable ways.

Many of the operations described herein may be implemented in hardware, software, and/or firmware, and/or any combination thereof. When implemented in software, code segments perform the necessary tasks or operations. The program or code segments may be stored in a processor-readable, computer-readable, or machine-readable medium. The processor-readable, computer-readable, or machine-readable medium may include any device or medium that can store or transfer information. Examples of such a processor-readable medium include an electronic circuit, a semiconductor memory device, a flash memory, a ROM, an erasable ROM (EROM), a floppy diskette, a compact disk, an optical disk, a hard disk, a fiber optic medium, etc.

Software code segments may be stored in any volatile or non-volatile storage device, such as a hard drive, flash memory, solid state memory, optical disk, CD, DVD, computer program product, or other memory device, that provides tangible computer-readable or machine-readable storage for a processor or a middleware container service. In other embodiments, the memory may be a virtualization of several physical storage devices, wherein the physical storage devices are of the same or different kinds. The code segments may be downloaded or transferred from storage to a processor or container via an internal bus, another computer network, such as the Internet or an intranet, or via other wired or wireless networks.

Many modifications and other embodiments of the invention(s) will come to mind to one skilled in the art to which the invention(s) pertain having the benefit of the teachings presented in the foregoing descriptions, and the associated drawings. Therefore, it is to be understood that the invention(s) are not to be limited to the specific embodiments disclosed. Although specific terms are employed herein, they are used in a generic and descriptive sense only and not for purposes of limitation.

The invention claimed is:

1. A method comprising:
   performing, by a power line communication (PLC) device,
      detecting a co-existence preamble on a PLC network having at least one native PLC device and at least one foreign PLC device;
      not receiving a native preamble;
      terminating transmissions to the PLC network for a network-specific time period; and
      resuming transmissions to the PLC network after expiration of the network-specific time period.

2. The method of claim 1, further comprising:
   decoding the communication according to a predetermine operation; and
   determining whether an error occurred while decoding the communication;
   sending data from the decoded communication to an upper device layer in response to a determination that no error occurred.

3. The method of claim 1 further comprising decoding incoming packets that do not require transmission of a responsive packet during the network-specific time period.

4. The method of claim 1, wherein the network-specific time period is a co-existence Extended Interframe Space (cEIFS) duration.

5. The method of claim 4, further comprising identifying a maximum cEIFS duration.

6. The method of claim 5, further comprising identifying a minimum cEIFS duration.

7. The method of claim 6, further comprising setting the cEIFS to the minimum cEIFS duration in response to a determination that all devices in the network are configured to transmit small-sized frames.

8. The method of claim 6, further comprising setting the cEIFS to the maximum cEIFS duration where no determination that all devices in the network are configured to transmit small-sized frames is made.

9. A power line communication (PLC) device, comprising:
   a processor; and
   a memory coupled to the processor, the memory configured to store non-transitory program instructions executable by the processor to cause the PLC device to:
      detecting a co-existence preamble on a PLC network having at least one native PLC device and at least one foreign PLC device;
      not receiving a native preamble;
      terminating transmissions to the PLC network for a network-specific time period; and
      resuming transmissions to the PLC network after expiration of the network-specific time period.

10. The PLC device of claim 9, further configured to:
    decode the communication according to a predetermine operation; and
    determine whether an error occurred while decoding the communication;

send data from the decoded communication to an upper device layer in response to a determination that no error occurred.

11. The PLC device of claim 9, further configured to decode incoming packets that do not require transmission of a responsive packet during the network-specific time period.

12. The PLC device of claim 9, wherein the network-specific time period is a co-existence Extended Interframe Space (cEIFS).

13. The PLC device of claim 9, further configured to identify a maximum cEIFS duration.

14. The PLC device of claim 9, further configured to identify a minimum cEIFS duration.

15. The PLC device of claim 14, further configured to set the cEIFS to the minimum cEIFS duration in response to a determination that all devices in the network are configured to transmit small-sized frames.

16. The PLC device of claim 13, further configured to set the cEIFS to the maximum EIFS duration where no determination that all devices in the network are configured to transmit small-sized frames is made.

* * * * *